United States Patent [19]

Tönnigs et al.

[11] Patent Number: 5,700,128

[45] Date of Patent: Dec. 23, 1997

[54] FEEDING OR STACKING DEVICE FOR SLAB-SHAPED WORKPIECES

[75] Inventors: Bodo Tönnigs, Lichtenberg; Dietmar Kaden, Mulda, both of Germany

[73] Assignee: Ligmatech Maschinenbau GmbH, Lichtenberg, Germany

[21] Appl. No.: 723,126

[22] Filed: Sep. 30, 1996

[30] Foreign Application Priority Data

Sep. 29, 1995 [EP] European Pat. Off. ............ 95115457

[51] Int. Cl.⁶ ................................................ B65G 60/00
[52] U.S. Cl. .................. 414/789.1; 414/728; 414/737; 414/793; 414/795.7; 414/796.7; 414/797
[58] Field of Search .................... 414/728, 795.7, 414/796.2, 796.7, 797

[56] References Cited

U.S. PATENT DOCUMENTS 2,809,769  10/1957  Clarke et al. ................ 414/728 X
5,244,343   9/1993  Lockert ............................ 414/797

FOREIGN PATENT DOCUMENTS

| 467453 | 1/1992 | European Pat. Off. . |
| 0512126 | 11/1992 | European Pat. Off. . |
| 2337093 | 7/1977 | France . |
| 2602622 | 7/1977 | Germany . |
| 4300565 | 7/1994 | Germany . |
| 2000739 | 1/1979 | United Kingdom . |

Primary Examiner—Janice L. Krizek
Attorney, Agent, or Firm—Sughrue, Mion, Zinn, Macpeak & Seas, PLLC

[57] ABSTRACT

A feed and stacking device for slab-shaped workpieces has a rigid frame which is pivotally mounted on a base stand for movement between a horizontal position and a raised position. A support bar is movable along the length of the frame and carries a plurality of vacuum operated pick-up devices for transferring a workpiece from a stack to a processing device or vice versa.

10 Claims, 7 Drawing Sheets

FEEDING OR STACKING DEVICE FOR SLAB-SHAPED WORKPIECES

BACKGROUND OF THE INVENTION

The object of the invention is a feeding or stacking device for slab-shaped workpieces.

Charging or stacking devices in many different varieties have been customary for a long period of time. The majority of the time they are used in combination with continuous operation machines or processing centers, e.g. for carrying out many different processing steps on slab-shaped wood workpieces, pressboard workpieces, plastic workpieces, etc.

A device for handling slab-shaped workpieces is described in the European patent disclosure document EP-A-0 512 126, for example. This device is supported by a vertical support column which travels along a horizontal axis. A horizontally projecting bracket follows the support column by means of a slide which travels along the support column in vertical direction. The bracket extends along a longitudinal axis direction like a telescope. At the free end of this telescope jib there is a second bracket which also extends in horizontal direction and is in transverse direction to the telescope jib. This second bracket travels in longitudinal axis direction relative to the telescope jib. It also has a slide which travels in longitudinal axis direction relative to the bracket. This slide in turn has a vacuum pick-up device comprised of several vacuum suction devices. These vacuum pick-up devices which take up slab-shaped workpieces, rotate relative to the slide and a vertical axis.

The device described in EP-A-0 512 126 makes it possible to lift stacked slap-shaped workpieces from the stack one by one and to place them on an intake conveyor, for example, of a continuous operation machine. However, the large number of traveling and swiveling functions and the respective brackets, slides, actuations and guides make this known device for handling slab-shaped workpieces rather complicated and rather large to the point where it takes up a comparatively large amount of space. In addition, the feeding area for a continuous operation machine or a processing center often is not sufficiently accessible so that it is difficult to switch from an automatic to a manual feeding process should that be necessary for some reason.

SUMMARY OF THE INVENTION

The invention is to create a feeding or stacking device for slab-shaped workpieces with a more simplified structure and which, in addition, provides easy accessibility of the working area when the automatic operation has to be switched to manual feeding.

The device in accordance with the invention is characterized by a comparatively simple and compact structure. Some additional handling functions which are included in the customary device described in the introduction, are left off because they are not needed in many applications in connection with the feeding of processing devices with slab-shaped workpieces or in connection with the stacking of slab-shaped workpieces. The device in accordance with the invention therefore is inexpensive and only requires comparatively little space.

In addition, the device in accordance with the invention has a pivoting device which makes it possible to preferably pivot upward the entire bracket device and its horizontal and vertical guides, the respective actuations and the actual handling device with regard to the base support device around a horizontal pivoting axis. In the case of manual feeding or stacking the employee has ergonomically safe access to the feeding or stacking area. The pivoting devices make it possible to fold up the carrying device including all add-on pieces from its working position into the folded up yield position without delay so that the function of the feeding or stacking device can be carried out manually or so that there is easy access for short-term repairs, for example. Automatic operation can be resumed just as quickly by swiveling the carrying device back directly into its working position.

Preferably the pivoting device is comprised of a pneumatic or hydraulic cylinder actuation. However, other suitable part-turn valve actuators can be used as well. The carrying device practically is a bracket or a carrying frame. Preferably the carrying frame has a closed frame construction. The base support device preferably is a pedestal or table shaped base frame. Depending on the structural facts, the base support device can also be a support column or something similar. Apart from the pivoting device, the base support device advantageously also holds the control system, such as the required control electronics for the feeding or stacking device. The base support device preferably is stationary, i.e. it does not travel. Since good accessibility to the working area is ensured by the fact that the carrying device can be pivoted up, no additional equipment or space is needed for guide rails, actuation, etc.

In a favorable embodiment the horizontal actuator is a pneumatic cylinder linear actuator without piston rod. The horizontal guides and actuators preferably have one axis. If needed, they also can have two. The vertical actuator for the handling device which is carried by the frame preferably is a pneumatic lifting cylinder actuator and especially a short-stroke lifting cylinder actuator. These preferred types of actuators for the horizontal and vertical actuation allow for a compact and comparatively light design which is favorable because these components can be pivoted. Of course it is possible to select other corresponding types of actuation. The frame which travels relative to the carrying device in a horizontal direction, preferably is comprised of a controller slide, especially in the form of a transverse bar, i.e. a tie-bar to which the vertical actuator and the handling device, which travels Vertically, are attached. Such a slide design also contributes to an overall compact and light design.

The handling device which is carried by the frame can travel horizontally and with the device being able to travel vertically with regard to the frame, preferably is a vacuum pick-up device. Depending on the concrete circumstances, it can also be a pick-up mechanism, clamping mechanism or a similar mechanism. As a vacuum pick-up device the handling device preferably is a single carrier having a frame or a similar design with the individual vacuum suction devices being attached to it. In order to be able to handle several workpieces simultaneously at least individual vacuum pick-up groups can be controlled independently of each other. For example, two workpieces stacked side-by-side can be picked up simultaneously and can then be placed on a feed device one by one per each handling operation.

Another favorable embodiment of the invention is comprised of the carrying device also having an aligner which aligns the workpiece which is to be handled in the horizontal plane before or after it is handled. Depending on the requirements, the aligner can align the workpieces in only one horizontal axial direction or in two horizontal axial directions. In the case of a single axis alignment, the aligner preferably is comprised of a dead stop and a mobile slider on the opposite side.

It is advantageous for the aligner to be located on the lateral outside of the carrying device so that it does not impede the horizontal movement of the vacuum pick-up device. For example, such an aligner can align a workpiece which is about to be picked up on a workpiece stack before it is picked up by the vacuum suction devices.

In an advantageous embodiment of the invention, the feeder or stacking device is comprised of a lifting device located below the carrying device which is used to feed or remove at least one workpiece. Such a lifting device is especially advantageous if the workpieces which are about to be fed are not being delivered individually but in the form of a stack or if a stack is to be made from the workpieces. The lifting device adjusts for the feeding or removal of the workpieces which are stacked on it. The adjustment ensures that the lifting device adjusts the lifting height by the height of one workpiece layer of the stack when a processing machine is being fed with workpieces which are stacked on the lifting device after a layer of workpieces has been removed by the handling device. In the opposite case, i.e. when a stack of workpieces is stacked on the lifting device, the lifting device adjusts downward by one layer of workpieces after a new layer of workpieces is added. This means that the adjusting lifting device ensures that the upper edge of the workpiece stack is always maintained on the same working level, be it during the stacking or unstacking of the workpiece stack. Practical embodiments are comprised of an elevating platform which constitutes the lifting device on one hand and on the other hand it is practical for the bearing surface of the lifting device to have a roller conveyor.

In a preferred embodiment of the invention the lifting device is designed for pit operations, i.e. the lifting device is designed so that it can be lowered to a level below the ground level on which the processing center or the continuous operation machine is located. For this purpose, it is possible to have a pit shaft into which the lifting device lowers a workpiece stack or, if there is another room under the ground level, it is possible to have an additional lowering area for the lifting device. This makes it possible to stack or unstack comparatively high stacks of slab-shaped workpieces. Due to the fact that the entire carrying device including all add-on pieces can be folded upward, it is possible to easily place high workpiece stacks onto the lifting device and to then lower it into a pit or remove it from a pit. There are no spatial conflicts with the handling device or its guide and actuator assemblies etc. which usually restrict the maximum stacking height of comparatively small workpiece stacks in customary devices. In accordance with the invention, the carrying device and the handling device and the respective components can be located directly above a lifting device such as an elevating platform or a lifting platform so that the entire feeding and stacking device only requires little space on the sides. The fact that the carrying device and all its add-on pieces can be pivoted around a horizontal axis combines the space-saving design of the device with good accessibility of this working area.

BRIEF DESCRIPTION OF THE DRAWINGS

In the following paragraphs two preferred exemplary embodiments of the feeding or stacking device for slab-shaped workpieces in accordance with the invention are explained in more detail with the help of the enclosed drawings.

DETAILED DESCRIPTION OF THE INVENTION

Figure 1:
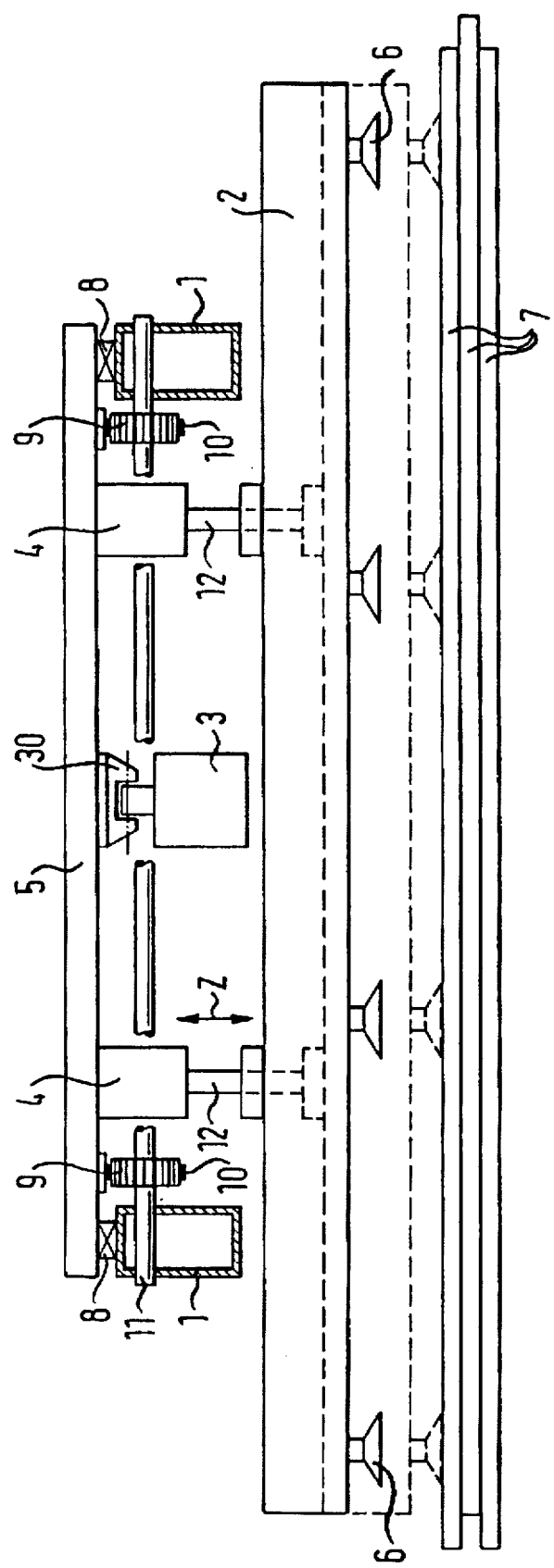
FIG. 1 shows a somewhat simplified cross-sectional view of a first exemplary embodiment of the feeding or stacking device in accordance with the invention.
Figure 2:
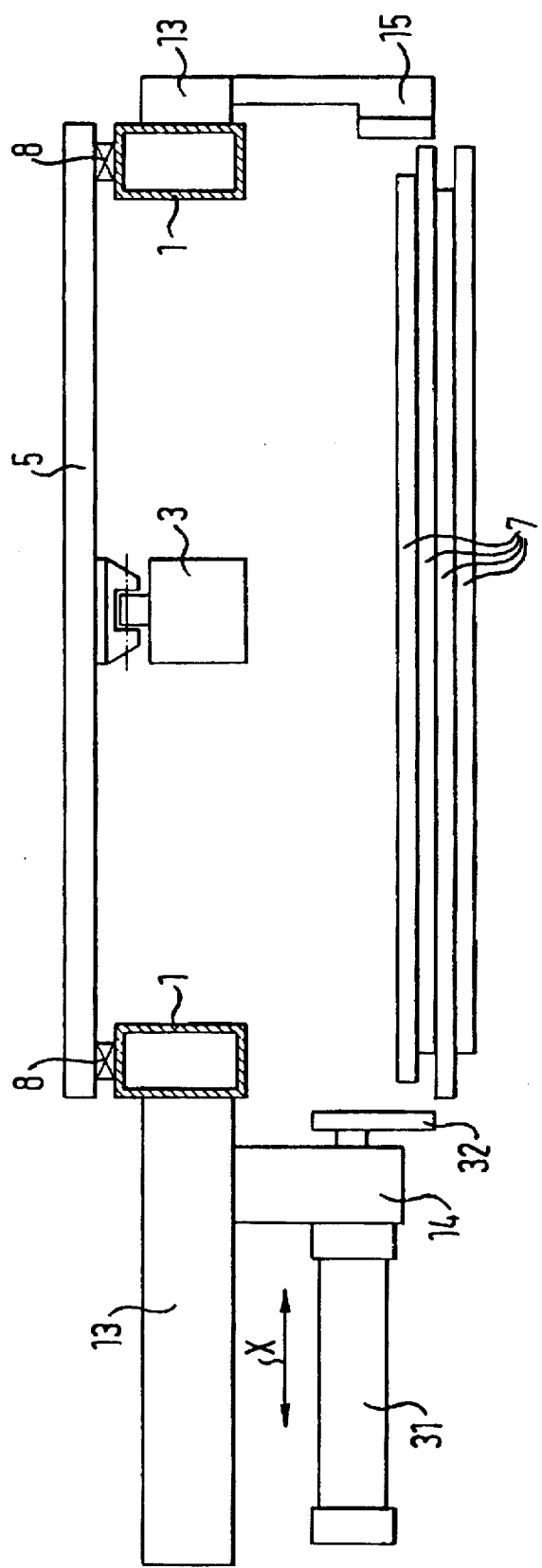
FIG. 2 shows a second and also simplified cross-sectional view of the first exemplary embodiment which is parallel to the first view in accordance with FIG. 1.
Figure 3:
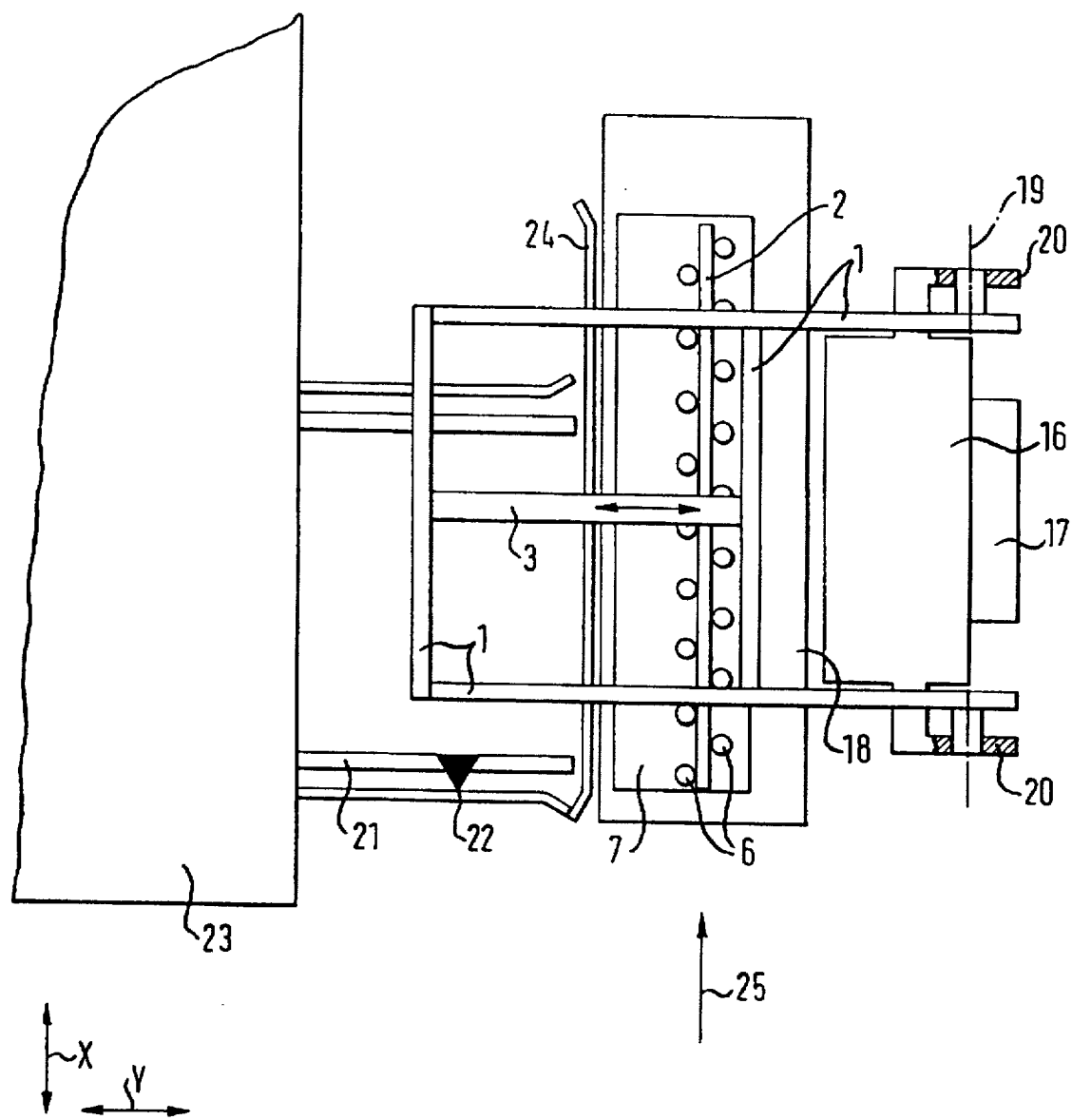
FIG. 3 shows a somewhat simplified top view of the first exemplary embodiment (turned by 90° with regard to FIGS. 1 and 2)
Figure 6:
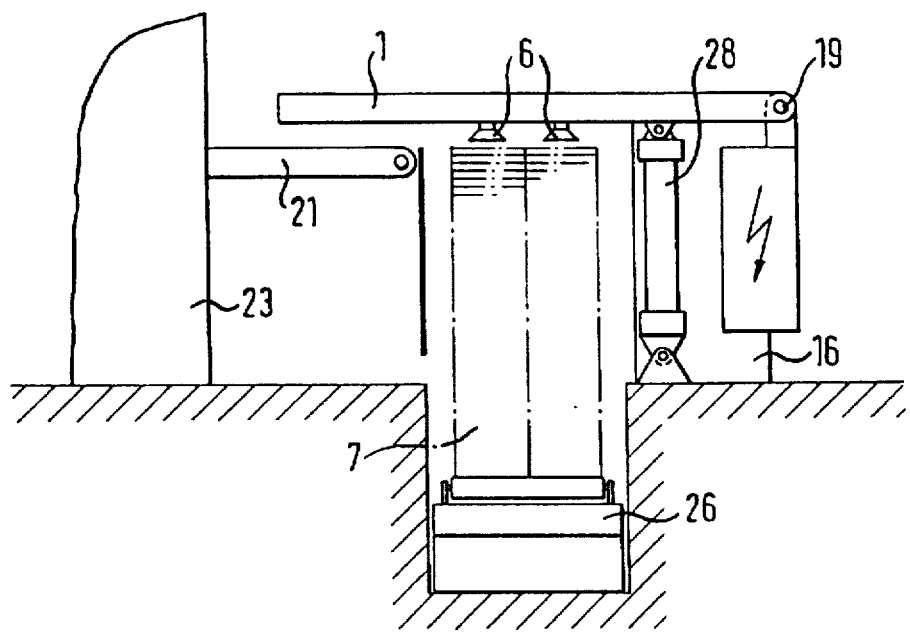

A structural design of a first exemplary embodiment of the feeding or stacking device for slab-shaped workpieces in accordance with the invention is shown in FIGS. 1–3. FIG. 3 shows that the device is comprised of a rigid closed frame 1 which is comprised of individual supports. At the right end as viewed in FIG. 3, the frame 1 is pivoted in bearings 20 (which are only shown schematically) and can pivot around a horizontal pivot axis 19. The frame 1 is mounted on a stationary, pedestal-shaped base stand 16 in a manner in which the frame 1 is in a horizontal operating position, as is shown in FIG. 3 or FIG. 6, above a feeding device 21 for a processing machine 23 (which is only shown schematically). The processing machine 23 is a continuous operation machine, a processing center or a similar device for slab-shaped workpieces 7 which are made of wood, pressboard, plastic or similar materials.

Apart from the supporting structure for supporting the frame 1 and apart from the bearings 20, the stationary base stand 16 is comprised of a switch box 17 with the respective control devices etc. and a pneumatic lifting cylinder actuator 28 having a piston rod 29 connected to the frame 1 for pivoting the frame around the horizontal pivot axis 19.

FIG. 1 shows that both longitudinal supports of the frame 1 each have linear guides 8 for guiding a transverse slide bar 5. In longitudinal direction of the frame 1, i.e. in the direction of Y (ref. FIG. 3) a pneumatic linear cylinder actuator 3 without a piston rod is located. The linear cylinder actuator 3 moves the slide bar 5 back and forth via a connecting element 30 along the guides 8 (ref. double arrow at 3 in FIG. 3). FIG. 1 shows that the slide bar 5 is provided with two toothed strips 10 which engage crown gears 9. The crown gears 9 are connected in a transverse direction via a synchronizing shaft 11 which is supported in the frame 1. The toothed strip 10, the crown gears 9 and the respective synchronizing Shaft 11 are to synchronize the two ends of the slide bar 5 in the linear guides 8 while the actuation of the slide bar 5 is carried out centrally via the linear cylinder actuator 3.

The slide 5 has two pneumatic short-stroke cylinder actuators 4 each having a piston rod 12 connected to a vacuum pick-up tie-bar 2 which is a transverse bar to which the vacuum suction devices 6 are attached in an off-set manner. The vacuum suction devices 6 have tactile valves (which are not shown). FIG. 1 shows two different positions in the vertical direction Z of the vacuum pick-up tie-bar 2. The continuous lines show an upper starting position of the pick-up tie-bar 2 in which the piston rods 12 of the short-stroke cylinder actuators 4 are retracted. The interrupted lines show a second position in which the piston rods 12 are extended to the bottom so that the vacuum suction devices 6 rest on the uppermost slab-shaped workpiece of a workpiece stack 7 and can pick up the upper workpiece 7.

Figure 11:
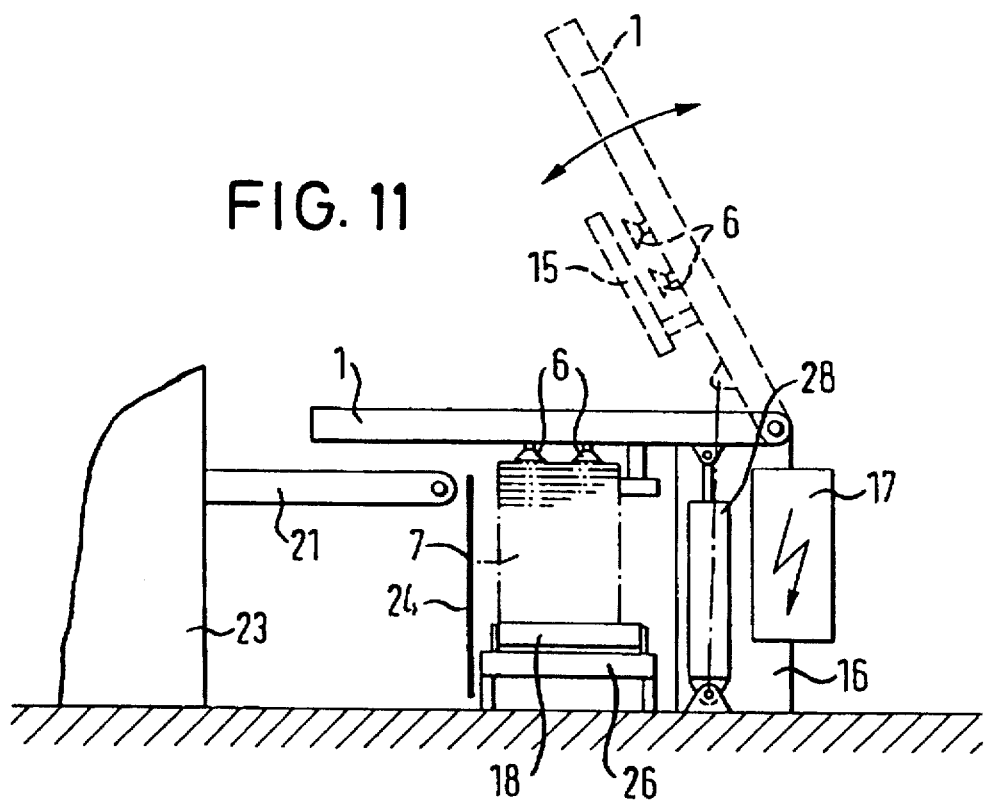
FIG. 11 shows a schematic view of a side view of a second exemplary embodiment of the feeding or stacking device in accordance with the invention.

FIG. 2 shows an aligner for aligning the slab-shaped workpieces 7 in the direction X, i.e. in the direction of the double arrow. The aligner is attached to the frame 1 by means of retainer support 13. The retainer support 13 has a dead stop 15 on the right side in FIG. 2 which forms the so-called zero edge for the alignment of the slab-shaped workpieces 7. On the side opposite the dead stop 15, i.e. on the left side in FIG. 2, a take-up device 14 is movably attached to the retainer support 13 for movement in the X direction with the take-up device having an actuation cylinder 31 and a respective slider 32. By moving the take-up device 14 along the respective retainer support 13, the aligner is adjusted to the respective size of the workpiece in the direction X and by actuating the slider 32 the slab-shaped workpieces 7 are aligned against the dead stop 15. The aligner is attached to the outside of the frame 1, for example in a position as is shown in FIG. 11 for the second exemplary embodiment (ref. reference number 15).

Due to reasons of simplification the aligner is not shown in FIGS. 1 and 3. Also due to reasons of simplification the actuation components and add-on pieces for the slide bar 5 are not shown in FIG. 2. FIG. 3 does not show the aligner, the slide bar 5 and the respective toothed belts, synchronizing shafts etc. for reasons of simplification. The directions of the axes in the horizontal plan in FIG. 3 are marked with X and Y double arrows in order to emphasize them.

Figure 4:
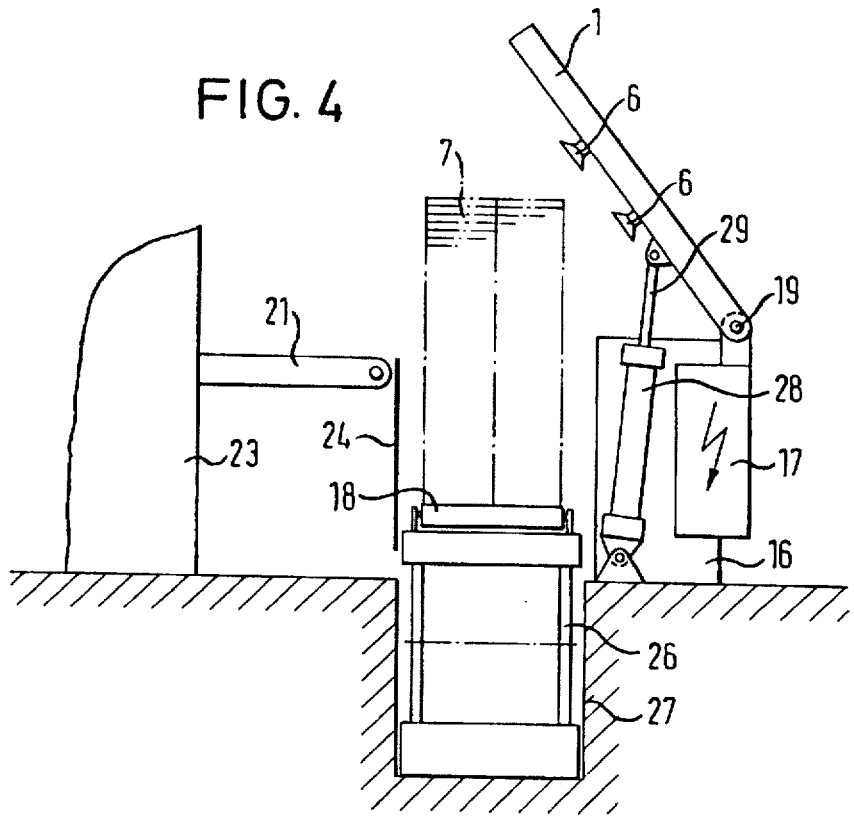
FIGS. 4 through 10 show a sequence of schematic side views of the first exemplary embodiment in different operating positions.

FIGS. 3 and 4 show that the first exemplary embodiment of the feeding and stacking device in accordance with the invention has a pivoted frame 1 with add-on pieces and the respective stationary base stand 16 with add-on pieces and in addition a lifting platform 26 which is located in a pit 27. The lifting platform 26 is below the frame 1 as shown in FIG. 3 wherein frame 1 is in the horizontal operating position. The lifting platform 26 has a roller conveyor 18 on its upper side on which the individual or stacked slab-shaped workpieces 7 are carried. The lifting platform 26 is located between the base stand 16 and a supply device 21, for example a conveyor belt, a roller conveyor or a similar device. The supply device 21 carries the slab-shaped workpieces 7 which are to be processed directly to the processing machine 23, i.e. to a continuous operation machine. Between the lifting platform 26 and the supply device 21 there is a knock-off sheet 24 which runs in a vertical direction. FIG. 3 shows that the supply device 21 also has an alignment ruler 22 on which the zero edge position is marked with a triangle.

Another feed device for supplying individual or stacked slab-shaped workpieces 7 to the lifting platform 26 is only indicated by an arrow 25. The feed device 25 can be a roller conveyor or a conveyor belt. FIG. 3 shows that the dimensions of the frame 1, the linear cylinder actuator 3 and the respective components are such that the vacuum pick-up tie-bar can move in the direction of Y over the lifting platform 26 and its workpieces 7 as well as over the supply device 21. The lifting platform 26 shown in FIG. 4 can adjust, i.e. the upper edge of the stack of workpieces 7 is adjusted to the pre-determined working height with the help of a light barrier control.

Now the operation of the above first exemplary embodiment of the feed or stacking device in accordance with the invention is explained with reference to FIGS. 4 through 10. It should be noted that only the frame 1 and the vacuum suction devices 6 are shown in a schematic manner in FIGS. 4 through 10 for reasons of simplicity and that the other components which are explained for FIGS. 1 through 3 such as the vacuum pick-up tie-bar, its actuators and guides and the aligner are not shown.

FIG. 4 shows the intake of a stack of slab-shaped workpieces 7 into the feed or stacking device. For this the frame 1 and all its add-on pieces are pivoted up around the horizontal pivot axis 19 by actuating the lifting cylinder actuator 28. Furthermore the lifting platform 26 is brought into an upper position in which the roller conveyor 18 is on the same level as the feed device 25 (ref. FIG. 3) which, for example can also be a roller conveyor. Now a workpiece stack 7 which is considerably higher than the level of the supply device 21 for feeding the processing machine 23, is supplied by the feed device 25 onto the lifting platform 26. Such a workpiece stack 7 whose height, as is shown in FIG. 4, can clearly exceed the working level of the supply device 21, can only be fed in because the frame 1 and its add-on pieces can be pivoted up. If this were not the case, the height of the stack which could be fed in would be restricted to the level which would be below the position of the vacuum suction devices 6 in the horizontal position of the frame 1.

Figure 5:
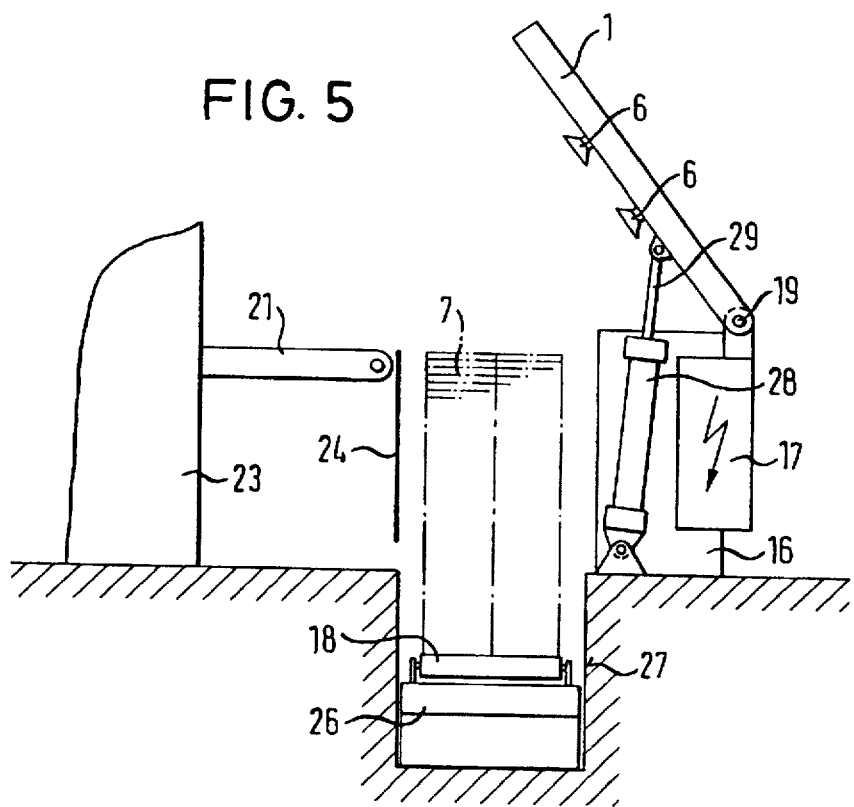
Figure 7:
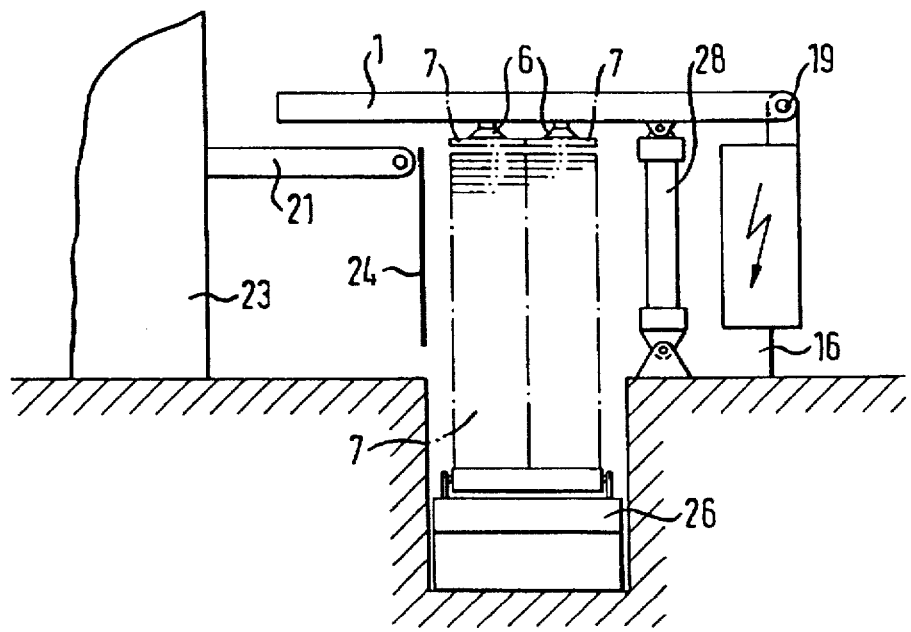

Now the workpiece stack 7 is lowered into the pit 27 by lowering the lifting platform 26, as is shown in FIG. 5. Then the frame and its add-on pieces are pivoted into the horizonal operating position, which is shown in FIG. 6, by actuating the lifting cylinder actuator 28. In this position the feed and stacking device is on stand-by. Now the vacuum suction devices 6 are lowered by actuating the short stroke cylinder actuators 4 until they reach the upper two workpieces 7 which are side-by-side on top of the stack. By lifting the vacuum pick-up tie-bar by means of the short stroke cylinder actuators the two upper workpieces 7 are lifted from the stack (ref. FIG. 7). Before the upper workpieces 7 can be taken in and lifted, the aligner which was explained earlier, can align the upper workpieces in the direction of X.

Figure 8:
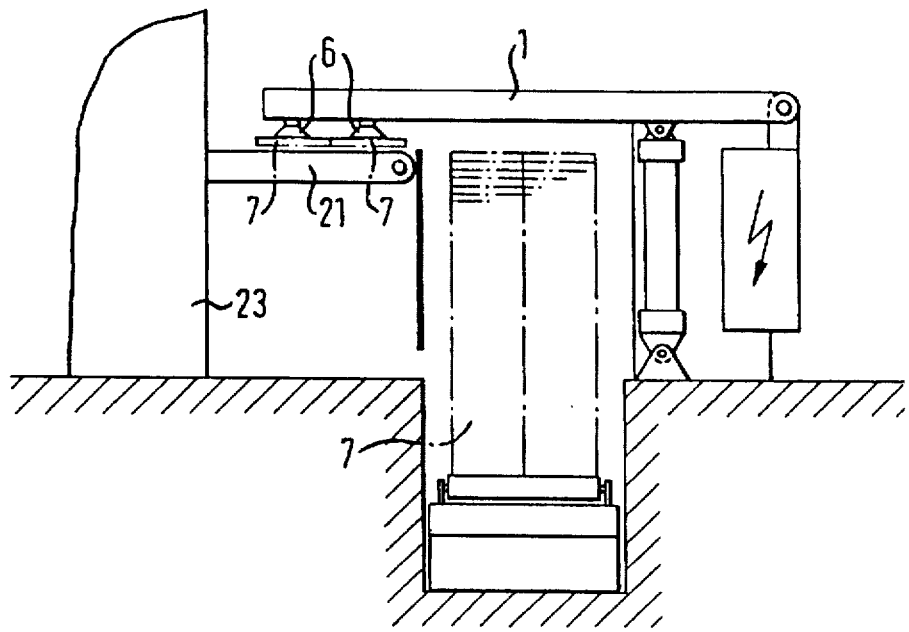
Figure 9:
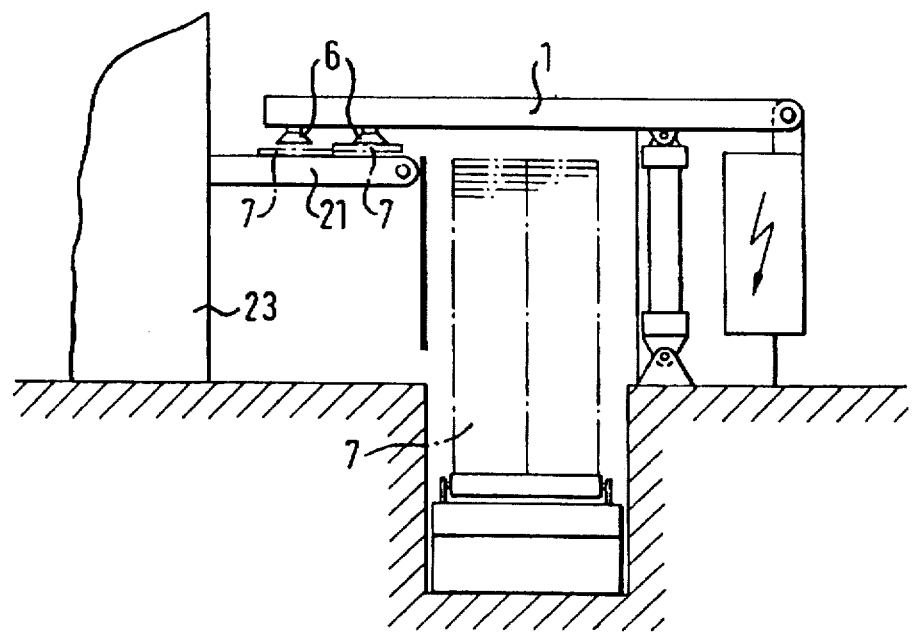
Figure 10:
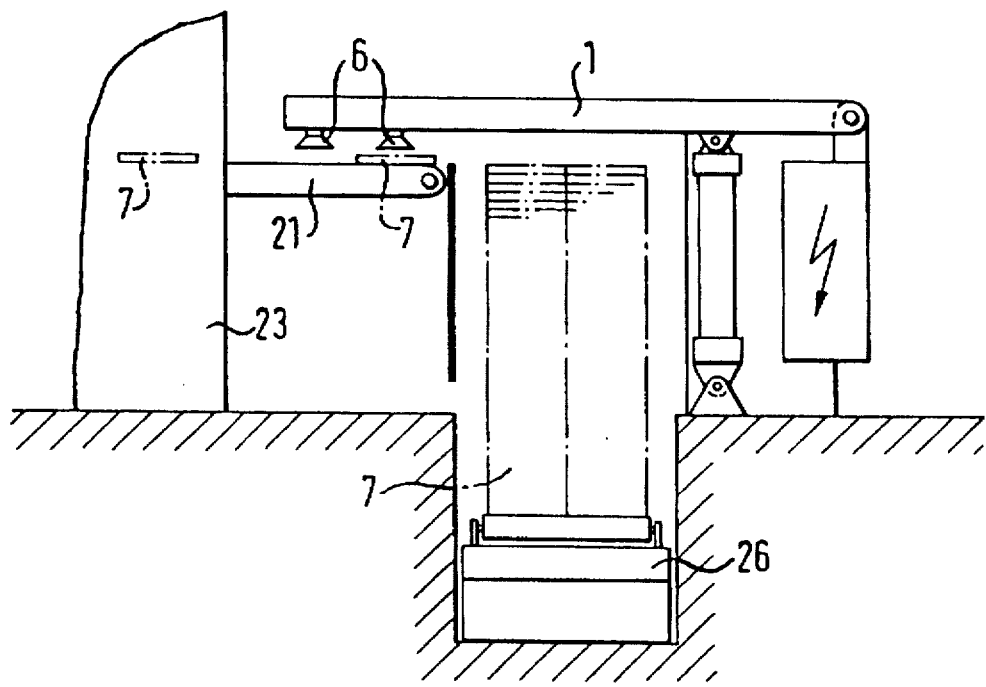

Now the vacuum pick-up tie-bar and the vacuum suction devices 6 attached to it and the two workpieces 7 taken up by the vacuum suction devices travel in the direction of Y until they are over the supply device 21 of the processing machine 23. This position is indicated in FIG. 8. FIG. 9 shows that the two workpieces 7 are now placed one by one onto the supply device 21 without actuating the short stroke cylinder actuations again and by turning off the suction of the vacuum suction devices 6 by means of a corresponding control device. The dropping of the second workpiece 7 is shown in FIG. 10. This happens after the first workpiece 7 is already in the processing machine 23. The time intervals between the dropping of the first and the second workpiece 7 are coordinated with the processing machine 23.

Then the vacuum pick-up tie-bar and the vacuum suction devices 6 return to the position indicated in FIG. 6 and the feed process starts again. In the meantime the lifting platform 26 has lifted the workpiece stack 7 by the height of one layer of workpieces so that the upper two workpieces 7 are at the pre-determined working height in which they are picked up by lowering the vacuum pick-up tie-bars by actuating the short stroke cylinder actuators.

This upward adjustment of the stack 7 makes it possible to use compact short stroke cylinder actuators for moving the vacuum pick-up tie-bar in the direction of Z since the vacuum pick-up tie-bar would have to be increasingly lowered otherwise in order to the able to pick up the upper workpieces 7. The short Stroke cylinder actuators make a comparatively simple and compact structure of the feed and stacking device which can be pivoted up. In addition it is easy to control since the lowering movement of the vacuum pick-up tie-bars in the direction of Z is always the same with regard to height while a workpiece stack is being dismantled. In addition the frequency of the feeding intervals can be increased by using the adjusting lifting platform since the vacuum pick-up tie-bar does not have to travel any large vertical distances and because the height of the stack can be adjusted simultaneously by the lifting device while the vacuum pick-up tie-bar is traveling with the workpieces.

If two or more stacked layers of the stack are removed when the upper workpiece(s) are lifted, the extra workpieces are knocked-off by the knock-off sheet 24 when the vacuum pick-up tie-bar passes this knock-off sheet in the horizontal direction (ref. the horizontal shifting movement which is between the positions shown in FIGS. 7 and 8).

The foregoing explains the operating sequence for the feeding of a continuous operation machine, a processing center or a similar device with slab-shaped workpieces. The control of the feed or stacking device is connected to that of the processing machine so that the feeding and processing of the workpieces is synchronized and smooth operation is ensured. In the described first exemplary embodiment the individual workpieces 7 or the workpiece stacks 7 are delivered by means of a feed device 25 transverse to the input direction into the processing machine 23 and the feeding by means of the feed or stacking device is carried out in the direction of the input direction in the processing machine. Of course the feed and stacking device can be such that, depending on the circumstances, the feeding of workpieces is transverse to the input direction, i.e. in the direction of X instead of in the input direction into the processing machine, i.e. in the direction of Y in the present case. The feed or stacking device can be such that the frame 1 is not an extension of the supply device 21 but instead is transverse to the supply device 21. The lifting platform 26 and the respective pit are different accordingly and the delivery of the workpieces 7 onto the lifting platform can be carried out from a different side with regard to the feed device 21.

Analogously, but in reverse order the device in accordance with the invention can also be used to pick up processed workpieces from a conveyor device and to form a workpiece stack on a lifting platform whereby this platform then is adjusted downward, i.e. the stack which is being formed is lowered by one layer height so that the new workpiece layer can always be placed on the same working height.

FIG. 11 shows a second exemplary embodiment of the feed and stacking device in accordance with the invention. The structure and the function of this embodiment correspond to those of the first embodiment but there is no pit for a lifting platform. The corresponding components have the same reference numbers as in the first exemplary embodiment so that the corresponding explanations and descriptions of functions apply. When the adjusting lifting platform 26 is on a normal ground level instead of on a lower pit level, the maximum stacking height for the workpieces is correspondingly limited.

Just as in the first exemplary embodiment the fact that the frame 1 and all its add-on pieces can be pivoted up provides good accessibility of the working area, e.g. for a short-term switch to manual feed or stacking operations. The fact that the device can be pivoted up is also beneficial for repair work. FIG. 11 shows the pivoted up as well as the horizontal position of the frame 1 whereby the pivoting direction is indicated by a double arrow.

While the invention has been particularly shown and described with reference to preferred embodiments thereof, it will be understood by those in the art that the foregoing and other changes in form and details may be made therein without departing from the spirit and scope of the invention.

What is claimed is:

1. A feeding or stacking device for slab-shaped workpieces comprising:
   a base stand,
   a rigid frame pivotally mounted on said base stand for pivotal movement about a pivot axis between a horizontal position and a raised position,
   a support bar movably mounted on said frame for movement along said frame toward and away from said pivot axis,
   first actuator means mounted on said frame for moving said support bar,
   workpiece handling means movably mounted on said support bar for movement perpendicular to said support bar,
   second actuator means carried by said support bar for moving said handling means,
   third actuator means mounted on said base stand for pivoting said frame about said pivot axis and
   alignment means mounted on said frame for aligning a workpiece disposed in a horizontal plane.

2. A feeding or stacking device as set forth in claim 1 wherein said base stand includes control means for controlling said first, second and third actuator means.

3. A feeding or stacking device as set forth in claim 1 wherein said alignment means includes a dead stop mounted on one side of said frame and slider means movably mounted on an opposite side of said frame.

4. A feeding or stacking device as set forth in claim 1 wherein said first, second and third actuator means are comprised of fluid operated piston and cylinder actuators.

5. A feeding or stacking device as set forth in claim 4 wherein said second actuator means is comprised of a short-stroke piston and cylinder assembly.

6. A feeding or stacking device as set forth in claim 1 wherein said handling means is comprised of a plurality of vacuum pick-up means.

7. A feeding or stacking device as set forth in claim 6 wherein said vacuum pick-up means are independently controlled in groups so that several workpieces can be handled simultaneously.

8. A feeding or stacking device for slab-shaped workpieces comprising:
   a base stand,
   a rigid frame pivotally mounted on said base stand for pivotal movement about a pivot axis between a horizontal position and a raised position,
   a support bar movably mounted on said frame for movement along said frame toward and away from said pivot axis,
   first actuator means mounted on said frame for moving said support bar,
   workpiece handling means movably mounted on said support bar for movement perpendicular to said support bar,
   second actuator means carried by said support bar for moving said handling means,
   third actuator means mounted on said base stand for pivoting said frame about said pivot axis, and
   lifting means mounted below said frame when said frame is in a horizontal position for carrying a stack of workpieces for engagement by said handling means.

9. A feeding or stacking device as set forth in claim 8 wherein said lifting means includes platform means vertically movable for adjusting the height of the stack.

10. A feeding or and stacking device as set forth in claim 9 further comprising conveyor means mounted on said platform means.

* * * * *